Aug. 16, 1966  H. P. PURSELL, JR  3,267,128
PROCESS FOR SEPARATION OF ACRYLONITRILE
Filed July 16, 1963
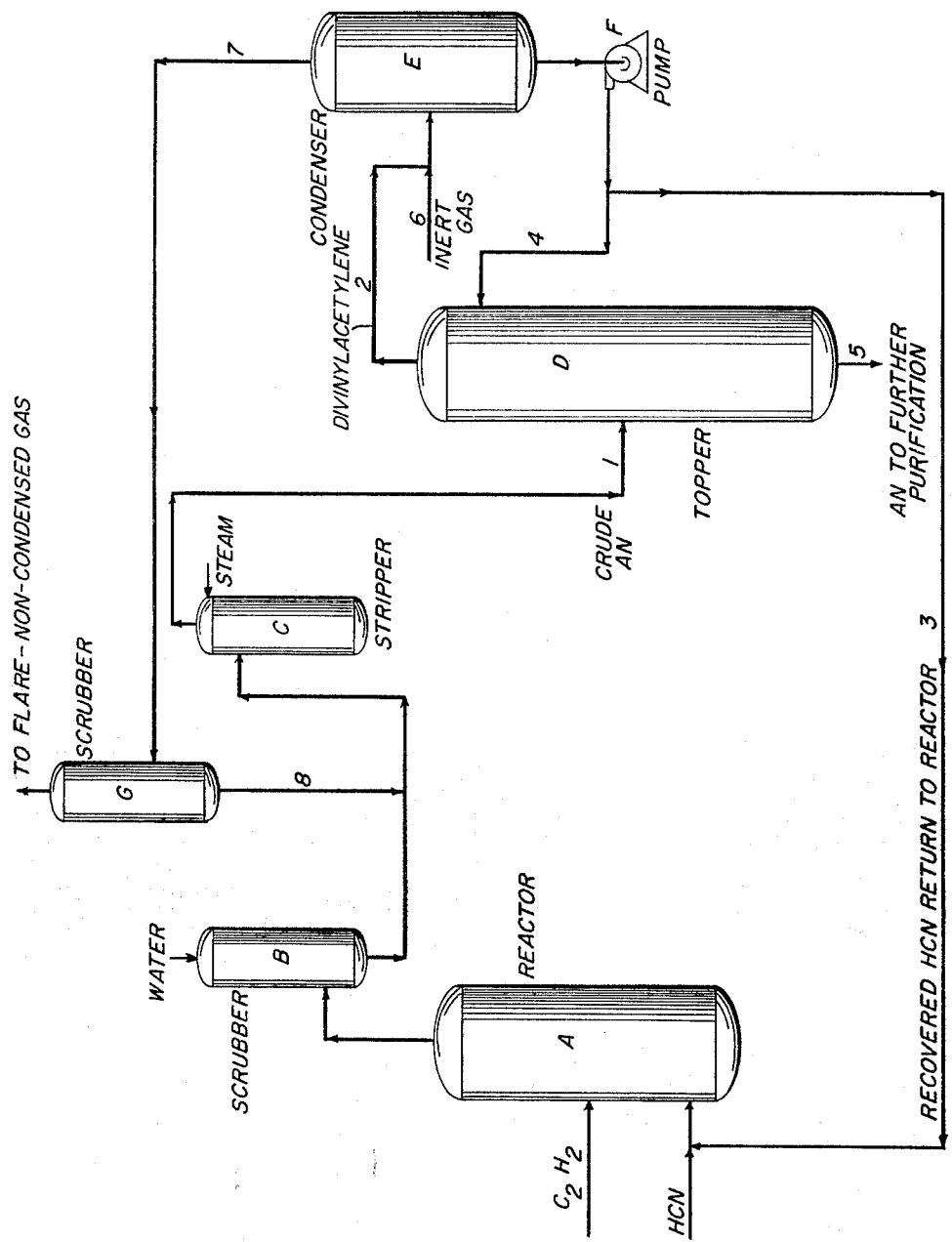
INVENTOR.
HERBERT PALFREY PURSELL, JR.
BY
Thomas V. Sullivan
ATTORNEY

United States Patent Office 3,267,128
Patented August 16, 1966

3,267,128
PROCESS FOR SEPARATION OF ACRYLONITRILE
Herbert Palfrey Pursell, Jr., Metairie, La., assignor to American Cyanamid Company, Stamford, Conn., a corporation of Maine
Filed July 16, 1963, Ser. No. 295,318
11 Claims. (Cl. 260—465.3)

This invention relates to the preparation of acrylonitrile. More particularly, it relates to the refining of crude acrylonitrile prepared by the catalytic reaction of acetylene and hydrogen cyanide. Even more particularly, it relates to the separation of acrylonitrile from divinylacetylene and low boiling impurities.

During the production of acrylonitrile from the reaction of acetylene with hydrogen cyanide in the liquid phase employing a cuprous salt catalyst, a number of acetylene derivatives such as monovinylacetylene, divinylacetylene, its homolog, ethylnylbutadiene, vinyl chloride, chloroprene, acetaldehyde, cyanobutadiene, methylvinylketone and lactonitrile are obtained. These impurities with boiling points which range above and below the boiling point of acrylonitrile are usually removed by numerous distillations and fractionations. However, even when these multi-step refining procedures are carried out on a crude acrylonitrile containing such impurities, not infrequently, the acrylonitrile product is contaminated by trace amounts (measured as parts per million) of acetaldehyde, methylvinylketone, cyanobutadiene, lactonitrile and divinylacetylene. For many applications, the presence of even such trace amounts is detrimental. For example, when acrylonitrile is to be employed for the production of acrylic fibers, the level of methylvinylketone, cyanobutadiene and divinylacetylene must be kept below extremely low limits in order that the resultant fibers be of high quality.

There have been numerous attempts made to remove such impurities, particularly the divinylacetylene impurity, in order to obtain a high quality acrylonitrile product. A rather extensive survey of the numerous methods and procedures which have been proposed for the removal of divinylacetylene from acrylonitrile appears in United States Patent No. 2,878,166 to J. T. Dunn, patented March 17, 1959. From the number of methods and procedures suggested for eliminating divinylacetylene from acrylonitrile described in that patent, it is to be seen that this contaminant has been a particularly vexing problem to acrylonitrile producers for many years.

Apart from the numerous proposals heretofore suggested and adopted for the removal of divinylacetylene from acrylonitrile, no one of which is entirely adequate for the complete elimination of this impurity, consideration has also been given by those skilled in the art to an alternative method of reducing or eliminating the divinylacetylene content of acrylonitrile. It will be noted that the many procedures suggested in the Dunn patent for eliminating divinylacetylene from acrylonitrile product proceed on the basis that divinylacetylene is already a contaminant. Numerous workers have known that if the vapor pressure of hydrogen cyanide above the catalyst in the reactor is maintained at a high level, the amount of divinylacetylene which is produced is thereby correspondingly decreased. Such a method of reducing or eliminating the divinylacetylene content of crude acrylonitrile would seem to be the most direct and most straightforward procedure were it not for several disadvantages to such a technique. Thus, it has been noted that a high partial pressure of hydrogen cyanide in the reactor causes a decrease in the activity of the cuprous salt catalyst. Consequently, the overall production rate of acrylonitrile from a given reactor unit is then decreased. In addition, utilizing a higher partial pressure of hydrogen cyanide above the catalyst increases the cost of the catalyst since, because of its reduced activity, more catalyst must be purged from the reactor with a corresponding loss in copper values. Moreover, a higher partial pressure of hydrogen cyanide within the reactor increases the demand for hydrochloric acid which is used to maintain a proper solubilizer ratio in the reactor thereby causing the production of additional quantities of vinyl chloride since the increased amount of hydrogen chloride being admitted to the reactor is also available to react with acetylene. Consequently, it is seen that neither reducing or eliminating the formation of divinylacetylene nor eliminating or reducing it after it is formed is entirely satisfactory.

It is an object of this invention to remove trace impurities from acrylonitrile while avoiding the disadvantages of the numerous prior art methods.

It is a further object of this invention to reduce the amount of divinylacetylene and low boiling impurities in product acryonitrile.

It is a still further object of this invention to improve the quality of acryonitrile by reducing the divinylacetylene concentration thereof.

Still further, it is an object of this invention to improve the efficiency of separation of divinylacetylene from acrylonitrile with essentially no increase in operating costs and minimal reduction in equipment capacity.

In accordance with the present invention, it has been discovered that a crude wet acrylonitrile solution containing divinylacetylene and low boiling impurities may be readily freed from such contaminants by distilling said crude wet acrylonitrile solution, withdrawing divinylacetylene and low boiling impurities from the distillation column and passing the same to a condenser, adding an inert gas to the condenser and returning a first portion of the so-condensed impurities to the column and recovering a substantially divinylacetylene-free and low boiling impurities-free acrylonitrile from the bottom of the column. A feature of the present invention is that a second portion of the so-condensed impurities may be recycled to the reactor for the production of additional acrylonitrile therefrom. Another feature of this invention is that the inert gas introduced to the condenser removes some of the condensable impurities, including some divinylacetylene, and thus prevents their recycling in the reactor and purification system. The inert gas containing the impurities is then scrubbed with water whereby additional amounts of water soluble hydrogen cyanide and acrylonitrile may be recovered and recycled to the process. The water insoluble gases which include the inert gas, divinylacetylene, vinyl chloride and monovinylacetylene are then vented and/or burned.

A consideration of several conventional methods of separation of a light or pseudo-light material from a heavier material is believed to be proper for a better understanding of the present invention. Thus, in the distillation of wet acrylonitrile solution, in order to remove low boiling impurities (i.e., light materials) therefrom, it is known that the distillation column might be operated with a higher ratio of reflux to overheads product. This has the disadvantage that operating costs are increased and equipment capacity is reduced. It is also known that a purge stream might be withdrawn from the column at a point of maximum concentration of the contaminant within the column. However, this method requires additional processing equipment. The present invention differs from such methods in that there is added to the condenser to which the low boiling impurities are admitted a stream of an inert gas, a light material, so as to reduce the concentration in the reflux of another material (divinylacetylene), which behaves as a light material, being separated. This in turn reduces the concentration of the undesirable component (divinylacetylene) in the bottom of the distillation column.

The process of the present invention is further described with reference to the accompanying drawing, a flow sheet illustrating a preferred emobdiment.

In the preparation of acrylonitrile by reacting acetylene and hydrogen cyanide in a reactor A, it is customary to scrub the reactor gases with water in a scrubber B. In this manner, a dilute aqueous acrylonitrile solution is obtained containing various impurities such as acetylene, hydrogen cyanide, acetaldehyde, methylvinylketone, cyanobutadiene lactonitrile, vinyl chloride, chloroprene, monovinylacetylene, divinylacetylene and ethylvinylbutadiene. The dilute aqueous acrylonitrile solution is then usually subjected to stream stripping in a stripper C to recover the acrylonitrile in a more concentrated form. The resultant concentrate 1 containing hydrogen cyanide, divinylacetylene and other contaminants is then fed into a topper or light ends removal column D where low-boiling materials (that is, those having a boiling point below about 70° C.) are separated from acrylonitrile. The overheads from the column pass via line 2 to a condenser E where the overheads are condensed. Part of the overhead condensate is returned via pump F to the acrylonitrile reactor via line 3 for hydrogen cyanide recovery, the remainder being refluxed via line 4 to the topper or light ends removal column. Normally, the ratio of flow of line 4 to line 3 is between 7/1 to 15/1 for complete separation of hydrogen cyanide from acrylonitrile. While divinylacetylene, a higher boiling material than hydrogen cyanide or acrylonitrile, would normally be expected to leave the bottom of the topper or light ends removal column with acrylonitrile in stream 5 and eventually become a product contaminant, it has been observed that in this column divinylacetylene is concentrated in the top and in the condenser along with the low boiling materials. Because of this behavior of divinylacetylene in this system, some separation of divinylacetylene from acrylonitrile is accomplished by operation of the topper or light ends removal column while maintaining the ratio of flow of line 4 to line 3 in the manner descirbed. The degree of separation of divinylacetylene from acrylonitrile in this column thus determines the divinylacetylene content of product acrylonitrile for given production rates of divinylacetylene and acrylonitrile.

It has been discovered that by continuously adding a stream of inert gas line 6 into the condenser, more complete separation of divinylacetylene from acrylonitrile is accomplished in the topper or light ends removal column. The recovered hydrogen cyanide from the condenser is returned to the reactor via line 3. Substantially all of the divinylacetylene, acting as a light component, is not condensed and is removed or stripped or purged from the condenser by the inert gas stream, together with low boiling impurities which are also not condensed. The stripped impurities, divinylacetylene and inert gas are then admitted via line 7 to a scrubber G wherein the water soluble components, e.g., hydrogen cyanide and acrylonitrile are removed and returned via line 8 to the feed to the stripper. The insoluble components are vented from scrubber G and usually burned. Such mode of removal of divinylacetylene results in a lower concentration of divinylacetylene in the reflux to the topper or light ends removal column and in the acrylonitrile leaving the bottom of the light ends removal column. This then results in a lower divinylacetylene concentration in product acrylonitrile.

After recovery of product acrylonitrile from the bottom of the topper or light ends removal column, the acrylonitrile so obtained is then subjected to additional conventional purification steps such as, for example, distilling, stripping, etc.

In the process of the present invention, the discovery is predicated on the principle that, since divinylacetylene is unexpectedly concentrated in the overheads of the topper or light ends removal column, the addition of the inert gas causes a substantial portion of the dinvylacetylene to pass through the condenser uncondensed, and thus reduces the total amount of divinylacetylene returned to the column as reflux and hence affords ready separation of divinylacetylene and low boiling materials from acrylonitrile. Additional equipment or further refining steps are eilminated since the non-condensed divinylacetylene and low boiling materials are usually burned as waste while hydrogen cyanide is returned to the reactor for additional utilization in the production of acrylonitrile.

The amount of inert gas to be added to the condenser wherein the overheads from the topper or light ends removal column are condense is not especially critical. It is generally advantageous that feed of gas be adjusted so as to reduce the concentration of the undesirable divinylacetylene component in the reflux to the topper or light ends removal column while avoiding introducing too large an amount of gas which would be detrimental to the purpose and operation of the column. Thus, the addition to the condenser of an inert gas approximately 1 volume to 20 volumes based on 100 volumes of overhead from the topper or light ends removal column, reduces the divinylacetylene concentration in the reflux to a tolerable level. This consequently reduces the concentration of the undesirable components, especially divinylacetylene, in the acrylonitrile removed as column bottoms.

Any gas which is inert to the materials being processed under the conditions of temperature and pressure being utilized in the system may be employed. Such gases include nitrogen, hydrogen, methane, helium and the like. Of these, nitrogen is especially preferred because of its ready availability to an acrylonitrile manufacturing facility, its low cost, etc.

It is also within the purview of this invention to introduce an inert gas and another light material, particularly hydrogen cyanide, to the condenser. The introduction of such light materials to the condenser markedly improves the overall efficiency of the process for removal of divinylacetylene and other low boiling impurities from acrylonitrile. The inert gas and hydrogen cyanide may be admitted to the condenser at different points thereof or both may be admitted as a mixture at the same point. Additionally, the feed of inert gas and hydrogen cyanide may be made simultaneously or stepwise. When an inert gas such as nitrogen and hydrogen cyanide are both added to the condenser, the ratio of the amount of each to the amount of divinylacetylene and other impurities introduced may be varied over wide limits. Ordinarily, from about 1 to 20 volumes of nitrogen and from about 5 to 100 liquid hydrogen cyanide equivalent volumes for each 100 moles of overhead gases are admitted to the condenser. Preferably, however, from about 3 to 10 volumes of nitrcgen and from about 20 to 50 liquid hydrogen cyanide equivalent volumes for each 100 moles of overhead gases are added to the condenser. Hydrogen cyanide which is added to the condenser together with hydrogen cyanide which is obtained by condensing the impurities from the topper or light ends removal column may then be recycled to the reactor via line 3.

The introduction of hydrogen cyanide only to the condenser for removal of divinylacetylene and low boiling impurities from acrylonitrile is described and claimed in copending application Serial No. 294,388 of Andrew M. Patterson, Jr. and Herbert P. Pursell, Jr., filed July 11, 1963.

The condenser may be any one of those conventionally employed. The present invention is thus not to be restricted to any particular type.

In order to better illustrate the present invention, the following examples are given in which the effect of intro-

Example 1

Acetylene is reacted with hydrogen cyanide in the presence of an aqueous cuprous salt catalyst in a conventional manner. The reactor gases are then introduced to a scrubber or water absorber and the scrubber or absorber bottoms are subsequently admitted to a stripper. From the stripper the crude acrylonitrile is then introduced to a topper or light ends removal column. The crude acrylonitrile solution fed to the column has the following composition:

| | | |
|---|---|---|
| Acrylonitrile | weight percent | 75.0 |
| Water | do | 7.5 |
| Methylvinylketone | p.p.m. | <300 |
| Lactonitrile | weight percent | 9.6 |
| Hydrogen cyanide | do | 7.5 |
| Acetaldehyde | p.p.m. | <100 |
| Cyanobutadiene | weight percent | 0.2 |
| Divinylacetylene | p.p.m. | 57 |
| Monovinylacetylene | p.p.m. | <100 |
| Chloroprene | p.p.m. | <100 |
| Vinyl chloride | weight percent | 0.2 |

The column is operated at an overhead temperature of 38° C. and the overhead vapors are drawn off and admitted to a condenser. The vent gases from the condenser are at a temperature of 15° C. and have the following composition:

| | | |
|---|---|---|
| Hydrogen cyanide | mole (volume) percent | 49.6 |
| Divinylacetylene | p.p.m. | 86 |
| Other non-condensed gaseous impurities | mole (volume) percent | 50.4 |

The condensed gases have the following composition:

| | | |
|---|---|---|
| Acrylonitrile | weight percent | 1.9 |
| Water | do | 0.1 |
| Methylvinylketone | p.p.m. | <100 |
| Lactonitrile | p.p.m. | <100 |
| Hydrogen cyanide | weight percent | 98.0 |
| Acetaldehyde | p.p.m. | <100 |
| Cyanobutadiene | p.p.m. | <100 |
| Divinylacetylene | p.p.m. | 500 |
| Monovinylacetylene | p.p.m. | <100 |
| Chloroprene | p.p.m. | <100 |
| Vinyl chloride | p.p.m. | <100 |

One portion of the condensed gases is refluxed to the topper or light ends removal column while another portion is recycled to the reactor. The ratio of the portion returned to the topper or light ends removal column to that recycled to the reactor is maintained at 5/1.

The composition of the light ends removal column bottoms is as follows:

| | | |
|---|---|---|
| Acrylonitrile | weight percent | 81.0 |
| Water | do | 8.1 |
| Methylvinylketone | p.p.m. | <300 |
| Lactonitrile | weight percent | 10.7 |
| Hydrogen cyanide | p.p.m. | 200 |
| Acetaldehyde | p.p.m. | <100 |
| Cyanobutadiene | weight percent | 0.2 |
| Divinylacetylene | p.p.m. | 10 |

The bottoms from the topper or light ends removal column are withdrawn and subsequently fed to other columns for drying, finishing and stripping.

Example 2

The procedure of Example 1 is repeated in all essential respects except that the ratio of the portion of the condensed gases returned to the topper or light ends removal column to that returned to the reactor is maintained at about 8/1.

A crude acrylonitrile solution is admitted to the topper or light ends removal column. The column is operated at an overhead temperature of 38° C. and the overhead vapors are drawn off and admitted to a condenser. The vent gases from the condenser are at a temperature of 15° C. and had the following composition:

| | | |
|---|---|---|
| Hydrogen cyanide | mole (volume) percent | 49.6 |
| Divinylacetylene | p.p.m. | 120 |
| Other non-condensed gaseous impurities | mole (volume) percent | 50.4 |

The condensed gases have the following composition:

| | | |
|---|---|---|
| Acrylonitrile | weight percent | 1.4 |
| Water | do | 0.1 |
| Methylvinylketone | p.p.m. | <100 |
| Lactonitrile | p.p.m. | <100 |
| Hydrogen cyanide | weight percent | 98.5 |
| Acetaldehyde | p.p.m. | <100 |
| Cyanobutadiene | p.p.m. | <100 |
| Divinylacetylene | p.p.m. | 700 |
| Monovinylacetylene | p.p.m. | <100 |
| Chloroprene | p.p.m. | <100 |
| Vinylchloride | p.p.m. | <100 |

One portion of the condensed gases is refluxed to the topper or light ends removal column while another portion is recycled to the reactor. The ratio of the portion returned to the topper or light ends removal column to that recycled to the reactor is maintained at 8/1. The composition of the topper or light ends removal column bottoms is as follows:

| | | |
|---|---|---|
| Acrylonitrile | weight percent | 81.0 |
| Water | do | 8.1 |
| Methylvinylketone | p.p.m. | <300 |
| Lactonitrile | weight percent | 10.7 |
| Hydrogen cyanide | p.p.m. | 75 |
| Acetaldehyde | p.p.m. | <100 |
| Cyanobutadiene | weight percent | 0.2 |
| Divinylacetylene | p.p.m. | 6 |

The bottoms are withdrawn and subsequently fed to other columns for drying, finishing and stripping.

Example 3

The procedure of Example 2 is repeated with a crude acrylonitrile solution being admitted to the topper or light ends removal column. Nitrogen is admitted with the column overhead gases to the condenser, which is operated at 15° C. The nitrogen causes additional hydrogen cyanide to pass into the vent scrubber and be recovered therein.

The composition of the feed to the topper or light ends removal column has the composition as appears in Example 1 except that it now contains the additional hydrogen cyanide recycled from the vent scrubber. This additional recycled hydrogen cyanide alters the feed stream composition as follows:

| | | |
|---|---|---|
| Acrylonitrile | weight percent | 73.3 |
| Water | do | 7.3 |
| Methylvinylketone | p.p.m. | <300 |
| Lactonitrile | weight percent | 9.3 |
| Hydrogen cyanide | do | 9.8 |
| Acetaldehyde | p.p.m. | <100 |
| Cyanobutadiene | weight percent | 0.2 |
| Divinylacetylene | p.p.m. | 56 |
| Monovinylacetylene | p.p.m. | <100 |
| Chloroprene | p.p.m. | <100 |
| Vinyl chloride | weight percent | 0.2 |

Nitrogen is admitted to the condenser at a rate of 5 volumes per 100 volumes of the overhead gases.

The vent gases from the condenser are at a temperature of 15° C. and have the following composition:

| | | |
|---|---|---|
| Divinylacetylene | p.p.m. | 80 |
| Nitrogen | mole percent | 28.0 |
| Hydrogen cyanide | do | 49.6 |
| Other non-condensed gaseous impurities | do | 22.4 |

The non-condensed gases are then admitted to a water scrubber operated at 36° C. Water is introduced at a rate sufficient to recover substantially all of the hydrogen cyanide in the gas stream. This rate is essentially the same as required in Example 2. The scrubber bottoms containing about 10% hydrogen cyanide and water are recycled to a crude acrylonitrile solution storage unit for further processing while the non-dissolved gases including divinylacetylene, monovinylacetylene, nitrogen and vinyl chloride are vented and burned.

The condensed gases have the following composition:

| | | |
|---|---|---|
| Acrylonitrile | weight percent | 1.4 |
| Water | do | 0.1 |
| Methylvinylketone | p.p.m. | <100 |
| Lactonitrile | p.p.m. | <100 |
| Hydrogen cyanide | weight percent | 98.5 |
| Cyanobutadiene | p.p.m. | <100 |
| Divinylacetylene | p.p.m. | 400 |
| Monovinylacetylene | p.p.m. | <100 |
| Vinyl chloride | p.p.m. | <100 |
| Nitrogen | p.p.m. | <100 |

One portion of the condensed gases is refluxed to the topper or light ends removal column while another portion is recycled to the reactor. The ratio of the portion returned to the topper or light ends removal column to that recycled to the reactor is maintained at 8/1. The composition of the topper or light ends removal column bottoms is as follows:

| | | |
|---|---|---|
| Acrylonitrile | weight percent | 81.0 |
| Water | do | 8.1 |
| Methylvinylketone | p.p.m. | <100 |
| Lactonitrile | weight percent | 10.7 |
| Hydrogen cyanide | p.p.m. | 75 |
| Acetaldehyde | p.p.m. | <100 |
| Cyanobutadiene | weight percent | 0.2 |
| Divinylacetylene | p.p.m. | 2 |

The bottoms from the column are withdrawn and subsequently fed to other columns for drying, finishing and stripping.

*Example 4*

The procedure of Example 3 is repeated in all essential respects with a crude acrylonitrile solution having the same composition being admitted to the topper or light ends removal column. The temperature of the overhead from such column has the temperature as appears in Example 2 and both nitrogen and hydrogen cyanide are admitted to the condenser operated at 15° C. together with such overhead gases.

Based on 100 volumes of overhead gases, nitrogen, at a rate of 5 volumes and liquid hydrogen cyanide equivalent to 25 volumes, are introduced to the condenser together with the overhead gases.

The vent gases from the condenser are at a temperature of 15° C. and have the following composition:

| | | |
|---|---|---|
| Hydrogen cyanide | mole percent | 49.6 |
| Nitrogen | do | 28.0 |
| Divinylacetylene | p.p.m. | 31 |
| Other non-condensed gaseous impurities | mole percent | 22.4 |

The non-condensed gases are then admitted to a water scrubber operated at 36° C. Water is introduced at a rate sufficient to recover substantially all of the hydrogen cyanide in the gas stream. This rate is essentially the same as required in Example 3. The scrubber bottoms containing about 10% hydrogen cyanide and water are recycled to a crude acrylonitrile solution storage unit for further processing while the non-dissolved gases including nitrogen, divinylacetylene, monovinylacetylene and vinyl chloride are vented and burned.

The condensed gases have the following composition:

| | | |
|---|---|---|
| Acrylonitrile | weight percent | 1.0 |
| Water | do | 0.1 |
| Methylvinylketone | p.p.m. | <100 |
| Lactonitrile | p.p.m. | <100 |
| Hydrogen cyanide | weight percent | 98.9 |
| Acetaldehyde | p.p.m. | <100 |
| Cyanobutadiene | p.p.m. | <100 |
| Divinylacetylene | p.p.m. | 180 |
| Monovinylacetylene | p.p.m. | <100 |
| Vinyl chloride | p.p.m. | <100 |
| Chloroprene | p.p.m. | <100 |
| Nitrogen | p.p.m. | <100 |

One portion of the condensed gases is refluxed to the topper or light ends removal column while another portion is recycled to the reactor. The ratio of the portion returned to the topper or light ends removal column to that recycled to the reactor has decreased to 2.5 to 1. There has been no other change in the operating conditions of the topper or light ends removal column. The composition of the light ends removal column bottoms is as follows:

| | | |
|---|---|---|
| Acrylonitrile | weight percent | 81.0 |
| Water | do | 8.1 |
| Methylvinylketone | p.p.m. | <300 |
| Lactonitrile | weight percent | 10.7 |
| Acetaldehyde | p.p.m. | <100 |
| Cyanobutadiene | weight percent | 0.2 |
| Divinylacetylene | p.p.m. | <1 |

The bottoms from the light ends removal column are withdrawn and subsequently fed to other columns for drying, finishing and stripping.

It is apparent that by operating according to the process of the present invention, the amount of divinylacetylene in the topper or light ends removal column bottoms is reduced from 6 p.p.m. (Example 2) to 2 p.p.m. (Example 3), a reduction of 67% when employing an inert gas, and from 6 p.p.m. (Example 2) to <1 p.p.m. (Example 4), a reduction of at least 83% when employing a mixture of an inert gas and hydrogen cyanide. Since divinylacetylene has been effectively eliminated in the topper or light ends removal column, the subsequent refining steps are now more easily accomplished.

While the foregoing invention has been described in conjunction with various preferred embodiments, it is to be understood that the invention is not to be limited thereto but is to be construed broadly and is to be limited only by the appended claims.

I claim:

1. A process for the separation of acrylonitrile from divinylacetylene and low boiling impurities which comprises passing a crude acrylonitrile solution, obtained by reacting acetylene and hydrogen cyanide in a reactor, containing said divinylacetylene and said impurities to a distillation column distill the same, withdrawing said dvinylacetylene and said impurities from the top of said column, passing the same to a condenser, adding an inert gas to said condenser, returning a first portion of the so-condensed impurities to said distillation column, and recovering a substantially divinylacetylene-free and low boiling impurities-free acrylonitrile from the bottom of said distillation column.

2. A process as in claim 1 in which a second portion of the so-condensed impurities are recycled to said reactor.

3. A process as in claim 2 in which the ratio of the portion of the so-condensed impurities returned to said column to the portion of so-condensed impurities recycled to said reactor is maintained at about 7/1 to about 15/1.

4. A process as in claim 3 in which the inert gas is nitrogen.

5. A process as in claim 4 in which the volume/volume ratio of nitrogen added to said condenser to divinylacetylene and low boiling impurities passed to said condenser is maintained at between about 1/100 to about 2/10.

6. A process as in claim 5 in which divinylacetylene and non-condensed impurities are removed from said condenser are introduced to a scrubber for recovery of hydrogen cyanide and acrylonitrile and said hydrogen cyanide and acrylonitrile so recovered are recycled and mixed with said crude acrylonitrile solution.

7. A process as in claim 1 in which hydrogen cyanide and said inert gas are added to said condenser.

8. A process as in claim 7 in which the inert gas is nitrogen.

9. A process for the separation of acrylonitrile from divinylacetylene and low boiling impurities which comprises passing a crude acrylonitrile solution, obtained by reacting acetylene and hydrogen cyanide in a reactor, containing said divinylacetylene and said impurities to a distillation column to distill the same, withdrawing said divinylacetylene and said impurities as overhead gases from the top of said column, passing the same to a condenser, adding hydrogen cyanide and an inert gas to said condenser, returning a first portion of the so-condensed impurities to said distillation column, and recovering a substantially divinylacetylene-free and low boiling impurities-free acrylonitrile from the bottom of said column, wherein the hydrogen cyanide and inert gas are added to said condenser in amounts of from about 1 to 20 volumes of said inert gas for each 100 moles of said overhead gases and from about 5 to 100 liquid hydrogen cyanide equivalent volumes for each 100 moles of said overhead gases.

10. A process as in claim 9 in which divinylacetylene and non-condensed impurities are removed from said condenser, are introduced to a scrubber for recovery of hydrogen cyanide and acrylonitrile and said hydrogen cyanide and acrylonitrile so recovered are recycled and mixed with said crude acrylonitrile solution.

11. A process as in claim 9 in which the inert gas is nitrogen.

References Cited by the Examiner
UNITED STATES PATENTS

| | | | |
|---|---|---|---|
| 2,425,267 | 8/1947 | Schulze et al. | 260—465.3 |
| 2,672,435 | 3/1954 | Shoptaw | 202—40 |
| 2,744,926 | 5/1956 | Koons | 260—465.3 |
| 2,851,478 | 9/1958 | Muller et al. | 260—465.3 |
| 3,023,226 | 2/1962 | England et al. | 260—465.3 |
| 3,080,301 | 3/1963 | Fontana et al. | 260—465.3 X |

NORMAN YUDKOFF, *Primary Examiner.*

F. E. DRUMMOND, *Assistant Examiner.*